United States Patent [19]

Ohtake

[11] Patent Number: 5,145,688
[45] Date of Patent: Sep. 8, 1992

[54] APPARATUS FOR VULCANIZING PNEUMATIC TIRES

[75] Inventor: Yasuhide Ohtake, Miyagi, Japan

[73] Assignee: Toyo Tire & Rubber Co., Ltd.

[21] Appl. No.: 592,143

[22] Filed: Oct. 3, 1990

[51] Int. Cl.$^5$ ............................................ B29C 35/02
[52] U.S. Cl. ...................................... 425/28.1; 425/40
[58] Field of Search .................... 425/35, 36, 45, 46, 425/47, 48, 49, 51, 52, 58, 28.1, 34.3

[56] References Cited

U.S. PATENT DOCUMENTS

| | | | |
|---|---|---|---|
| 3,730,658 | 5/1973 | Marra | 425/46 |
| 3,768,937 | 9/1974 | Singh | 425/58 |
| 3,890,073 | 6/1975 | Getz | 425/58 |
| 4,092,090 | 5/1978 | Yuhas et al. | 425/58.1 |
| 4,453,902 | 6/1984 | Imbert | 425/47 |
| 4,800,059 | 1/1989 | Drewel et al. | 425/36 |
| 4,813,861 | 3/1989 | Hasegawa et al. | 425/47 |
| 4,927,344 | 5/1990 | Amano et al. | 425/47 |

FOREIGN PATENT DOCUMENTS 2068708  9/1985  Japan ............................ 425/52

*Primary Examiner*—Willard Hoag

[57] ABSTRACT

In a vulcanizing apparatus of the two-piece mold type, an upper cover surrounding the upper mold section is fixed to an upper sealing plate under an upper platen and a lower cover is fixed below the upper cover through a flexible seal tube, the upper and lower covers being connected by a plurality of air cylinders to urge the lower cover downward. In a vulcanizing apparatus of the segmental mold type, a jacket ring surrounding the upper mold section is fixed on an upper sealing plate under an upper platen, an upper cover surrounding the jacket ring is fixed to the sealing plate, and a lower cover is fixed below the upper cover through a fleixble seal tube, the upper and lower covers being connected by a plurality of air cylinders to urge the lower cover downward.

2 Claims, 3 Drawing Sheets

APPARATUS FOR VULCANIZING PNEUMATIC TIRES

BACKGROUND OF THE INVENTION

1. Technical Field

This invention relates to an apparatus for vulcanizing pneumatic tires and particularly to a vulcanizing apparatus of a type having no vent holes in the mold.

2. Background Art

As for apparatus for vulcanizing pneumatic tires, there is known a vulcanizing machine of the two-piece mold type wherein the mold comprises an upper mold section for molding one side of the carcass and one half of the tread of a pneumatic tire and a lower mold section for molding the other side of the carcass and the remaining half of the tread, the upper mold section being vertically movable with respect to the lower mold section. A vulcanizing machine of the segmental mold type is also known wherein the mold comprises an upper mold section for molding one side of the carcass of a pneumatic tire, a lower mold section for molding the other side of the carcass, and a sector segment in the form of a segment for molding the tread, the upper mold section being vertically movable with respect to the lower mold section, said sector segment being slidable radially of the upper mold section, said sector segment being slid by the upward and downward movement of a jacket ring which surrounds said sector segment, said jacket ring having a downwardly diverging taper.

Thus, when the mold is closed, the air between the inner surface of the mold and the green tire surface is removed by suction to cause the green tire surface to contact the inner surface of the mold, thereby making it unnecessary to form vent holes. Such vulcanizing machine is known; for example, Japanese Patent Application Disclosure No. 26872/1973 discloses a system wherein a cylindrical hollow upper frame installed above the center of the upper mold section of the two-piece mold type for vertically moving said upper mold section has a doughnut-like upper platen fixed at the lower end thereof and a bell-shaped cover covering the upper mold fixed on the lower surface thereof, the upper end of said cover being fixed, while a cylindrical cover having the same diameter as the lower half of said bell-shaped cover is fixed upright on a lower platen supporting, from below, the lower mold section of the two-piece mold type, the arrangement being such that when the lowering movement of the upper mold section causes the lower edge of the bell-shaped cover and the upper edge of the cylindrical cover to approach each other with a predetermined distance therebetween and before the green tire contacts the mold and before the mold is closed, the lower end of a metal bellows fixed in advance to the bell-shaped cover is pressed at its lower end against the upper surface of the lower platen, or a cylindrical body fixed in place of the metal bellows is inserted in a labyrinth rubber packing on the lower platen, or the lower edge of the bell-shaped cover is pressed against a rubber tube fixed in advance to the upper edge of the cylindrical cover, whereby the space in the cover is closed, so that the air in said space in the cover is removed by suction through an exhaust tube connected to the top of the bell-shaped cover.

However, in the vulcanizing apparatus described above, since the bell-shaped cover covering the upper platen is fixed to the upper frame extending upward from the middle of the upper platen, the space requiring closing between the upper surface of the green tire and said cover is of substantial volume, and a long time is expended in removing the air therein by suction. Further, in the case where a metal bellows is used for closing, its diameter is greater than that of the bell-shaped cover and the pressure differential between the exterior and interior of the bellows is high, making it difficult to keep the spring characteristics uniform; thus, the parallelism of the lower surface of the bellows with the surface of the lower platen is decreased to make the airtight sealing insufficient. Further, in the case where a labyrinth rubber packing is used, the sealing quality deteriorates even if there is a slight misregistration between the cylindrical body fixed to the outer surface of the bell-shaped cover and the labyrinth rubber packing fixed to the lower platen. Further, in the case of using rubber, the rubber tube, when filled with air, is inflated to have a circular cross section. Therefore, in order to increase the lowering stroke of said bell-shaped cover which lasts from the time the lower edge of the bell-shaped cover starts to contact the upper surface of the rubber tube until the mold is closed, it is necessary to increase the diameter of the rubber tube, in which case there is a problem that the outer diameter of the apparatus must be increased.

OBJECTS OF THE INVENTION

This invention provides a vulcanizing apparatus which is easy to operate, wherein the closed space can be narrowed and accurately sealed.

SUMMARY OF THE INVENTION

To solve the problems described above, the invention provides a vulcanizing apparatus of the two-piece mold type, comprising an upper sealing plate disposed between an upper mold section and an upper platen for fixing said upper mold section, said upper sealing plate covering the upper surface of said upper mold section and having a greater outer diameter than that of the upper mold section, a lower sealing plate disposed between a lower mold section and a lower platen for fixing said lower mold section, said lower sealing plate covering the lower surface of said lower mold section and having a larger outer diameter than that of the lower mold section, the contact region between the upper mold section and the upper sealing plate and the contact region between the lower mold section and the lower sealing plate being airtightly defined, a cylindrical upper cover surrounding said upper mold section, said cylindrical upper cover being airtightly fixed at its upper end to the outer periphery of the lower surface of the upper sealing plate, a cylindrical lower cover loosely fitted to the upper cover and surrounding the lower mold section, said cylindrical lower cover being connected to the lower end of said upper cover through a flexible seal tube so as to hang therefrom, a plurality of air cylinders fixed at equal intervals to the outer surface of the upper cover with their piston rods directed downward, the front ends of said piston rods being connected to the lower end of the lower cover to urge the latter downward, the urging providing airtight contact surfaces when the lower edge of the lower cover contacts the lower sealing plate, said upper cover, seal tube, lower cover and upper and lower sealing plates forming an expansible cover, the latter being provided with an exhaust port for connecting the inner space to a vacuum source.

Further, a vulcanizing apparatus of the segmental mold type comprises an upper sealing plate covering the lower surface of an upper platen and having a larger outer diameter than that of a jacket ring surrounding a sector segment, said upper sealing plate being disposed between the jacket ring and an upper platen for fixing said jacket ring, a lower sealing plate covering the upper surface of a lower platen and having a larger outer diameter than that of the jacket ring surrounding a sector segment, said lower sealing plate being disposed between a lower mold section and a lower platen for fixing said lower mold section, whereby the contact region between the jacket ring and the upper sealing plate is airtightly formed, a cylindrical upper cover surrounding the jacket ring and airtightly fixed at its upper end to the outer periphery of the lower surface of the upper sealing plate, a cylindrical lower cover loosely fitted to the upper cover and surrounding the jacket ring, said cylindrical lower cover being connected to the lower end of said upper cover through a flexible seal tube so as to hang therefrom, a plurality of air cylinders fixed at equal intervals to the outer surface of the upper cover with their piston rods directed downward, the front ends of said piston rods being connected to the lower end of the lower cover to urge the latter downward, the urging providing airtight contact surfaces when the lower surface of the lower cover contacts the lower sealing plate, said upper cover, seal tube, lower cover and upper and lower sealing plates forming an expansible cover, the latter being provided with an exhaust port for connecting its inner space to a vacuum source.

In the vulcanizing apparatus of the two-piece mold type, when the upper mold section is lifted to be separated from the lower mold section, the upper cover fixed to the lower surface of the upper platen through the upper sealing plate is lifted, and simultaneously therewith the seal tube below the upper cover is stretched and the lower cover is separated from the lower sealing tube. And when the upper mold section is further lifted and retracted, a green tire is placed on the lower mold section. At this time, the lower bead of the green tire contacts the bead ring of the lower mold section to support the green tire.

Subsequently, the upper mold section is moved above the lower mold section and then lowered until the bead ring of the upper mold section contacts the upper bead of the green tire, whereupon the compression of the green tire is started and approximately concurrently therewith the lower end edge of the lower cover contacts the lower sealing plate to close the inner space of the expansible cover. As soon as the lower end edge of the lower cover contacts the lower sealing plate, the vacuum source is operated to evacuate the air in the inner space of the expansible cover. And while this evacuation is continuing, the lowering of the upper mold section proceeds, during which the piston rods of the air cylinders outside the upper cover are retracted against the pressures in the cylinders and the seal tube between the upper and lower covers is folded. When a substantial vacuum is produced in said inner space, the upper and lower mold sections contact each other to close the mold completely, whereupon vulcanization is started.

In the vulcanizing apparatus of the segmental mold type, the jacket ring is lifted to separate the sector segment radially outward from the upper and lower mold sections. In this state, the upper mold section, and sector segment and jacket ring are moved rearwardly upward from above the lower mold by the upper frame so as to open the mold. With the mold thus opened, a green tire is placed on the lower mold section and the upper frame is driven to move the upper mold section and sector segment and jacket ring to the lower mold section and then lower them as a unit. With this lowering movement, the upper cover, seal tube and lower cover disposed outside the jacket ring are simultaneously lowered, until the lower end edge of the lower cover contacts the upper surface of the lower sealing plate. When the piston rods start to retract against the urging forces of the air cylinders, the inner space of the cover is isolated from the open air, and the air in said inner space is evacuated through the exhaust port to reduce the pressure in the inner space. During this pressure reduction, the upper mold section, sector segment and jacket ring continue to lower until the upper mold section contacts the green tire, whereupon the compression of the green tire is started. When the upper mold section and sector segment are lowered to a predetermined height, the lowering of the upper mold section is stopped, while the jacket ring alone continues to lower to push the sector segment inwardly. After the inner space has been substantially evacuated, the sector segment contacts the upper and lower mold sections and the jacket ring stops lowering. And during lowering movement of the jacket ring, the piston rods of the air cylinders are retracted to decrease the distance between the upper and lower covers to fold the seal tube.

EFFECTS OF THE INVENTION

According to the invention, in the vulcanizing apparatus of the two-piece mold type, the upper cover surrounding the upper mold section is fixed to the upper sealing plate below the upper platen, and the lower cover is fixed below the upper cover through a flexible tube, said upper and lower covers being connected by a plurality of air cylinders to urge the lower cover downward. Further, in the vulcanizing apparatus of the segmental type, the jacket ring surrounding the upper mold section is fixed on the upper sealing plate below the upper platen and the upper cover surrounding said jacket ring is fixed to the sealing plate, while the upper and lower covers are connected by a plurality of air cylinders to urge the lower cover downward. Therefore, after a green tire is placed on the lower mold section, if the upper mold section is lowered by the upper platen of the vulcanizing apparatus and if the jacket ring is lowered by the upper platen of the vulcanizing apparatus of the segmental mold type, the lowering of the upper platen from above to a desired height results in the space defined by the outer surface of the green tire, the upper cover, the seal tube and the lower cover being closed. At this time, the lower cover is downwardly urged by the plurality of air cylinders and since the lower cover is connected to the upper cover through the seal tube, a closed space can be defined without any trouble even if there is misregistration between the upper and lower covers. And the upper cover is fixed to the lower surface of the upper platen through the upper sealing plate, and the lower end of the lower cover is pressed against the upper surface of the lower sealing plate placed on the lower platen. Therefore, a satisfactory seal preventing leakage can be obtained even if the upper and lower platens are formed with a number of holes for attaching various tire molds. Furthermore, since a closed space is defined between the upper and lower sealing plates, the closed space is narrow and the time required for pressure reduction is shortened, as compared with the conventional apparatus in which the upper end of a bell-shaped cover is fixed to the upper frame above the upper platen to cover the latter.

DETAILED DESCRIPTION OF THE PREFERRED EMBODIMENTS

Figure 1:
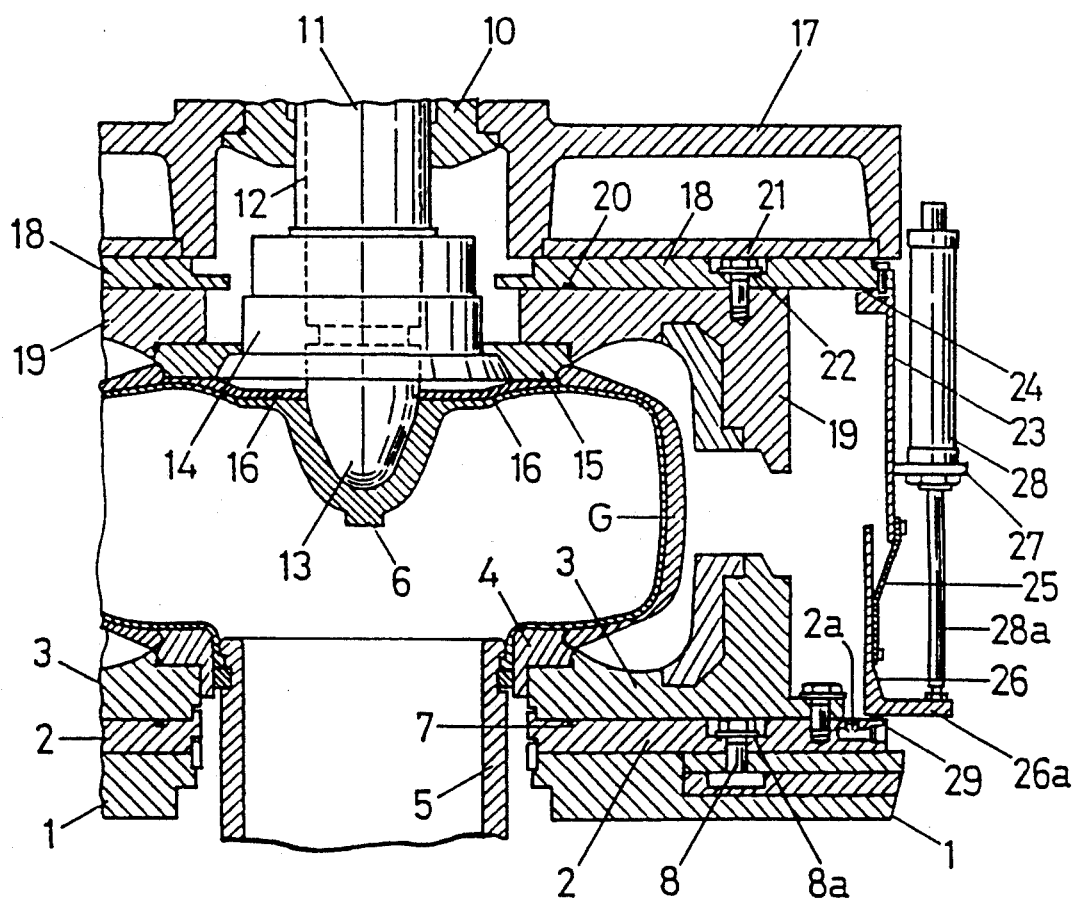
FIG. 1 is a vertical sectional view of an embodiment of a vulcanizing apparatus of the two-piece mold type.

FIG. 1 shows an example of a vulcanizing apparatus of the two-piece mold type. A lower platen 1 positioned below is stationary, fixed on the lower frame (not shown) of the vulcanizing apparatus. A lower mold section 3 is fixed on the lower platen 1 through a doughnut-shaped lower sealing plate 2 of substantially the same size as the lower platen 1. A lower bead ring 4 is fixed on the inner periphery of the lower mold section 3, and the mouth of a bladder 6 is fixed between the lower bead ring 4 and a cylindrical bagwell 5. Thus, a seal ring 7 of large diameter is installed between the contact surfaces of the lower mold section 3 and lower sealing plate 2 at a position nearer to the inner diameter, and a seal ring 8a of small diameter is installed between the contact surfaces of a washer, which is disposed below the head of a bolt 8 for connecting the lower sealing plate 2 and lower platen 1, and the lower sealing plate 2. Thus, the upper surface of the lower sealing plate 2 is hermetically formed.

An upper frame 10 positioned above said lower mold section 2 is cylindrically formed and is vertically liftable along the center line of the lower mold section 2 and is movable rearward (toward the back of the paper) from the upper end of the vertical stroke. The upper frame has a hollow drive shaft 11 mounted therein and said hollow drive shaft 11 has a ram cylinder 12 vertically slidably fitted therein. And a spindle-shaped ball nose 13 is attached to the lower end of the ram cylinder 12 and is fitted in the concave portion at the center of the upper surface of the bladder 6. An upper bead ring 15 is fixed to the lower end of the hollow drive shaft 11, and a plurality of chuck plates 16 adapted to swing radially along the block 14 and the lower surface of the upper bead ring 15 are installed. A green tire G is held between the upper and lower bead rings 15 and 4, and the chuck plates 16 are outwardly slid so that their front ends support the upper bead of the green tire from below.

On the other hand, an upper platen 17 is fixed to the lower end of the upper frame 10, and an upper mold section 19 is fixed to the lower surface of said upper platen 17 through an upper sealing plate 18. A seal ring 20 of large diameter is installed between the contact surfaces of the upper sealing plate 18 and upper mold section 19 at a position nearer to the inner diameter, and a seal ring 22 of small diameter is installed between the contact surfaces of a washer, which is disposed below the head of a bolt 21 for connecting the upper sealing plate 18 and upper mold section 19. The upper sealing plate 18 covers the upper mold section 19 and is larger than the outer diameter of the upper mold section 19. A cylindrical upper cover 23 surrounding the upper mold section 19 is fixed on the lower surface of said upper sealing plate 18 through a seal ring 24 of large diameter, and a cylindrical lower cover 26 smaller in diameter than the upper cover 23 is connected to the lower end of the upper cover 23 through a flexible seal tube 25. The lower cover 26 has an outwardly directed flange 26a at the lower end, and a plurality of air cylinders 28 are fixed at equal intervals to the outer surface of the upper cover 23 by brackets 27, with their piston rods 28a connected to the flange 26a. The distance from the upper end of the upper cover 23 to the lower end of the lower cover 26 with the piston rods 28a projected and with the seal tube 25 stretched is set such that when the hollow drive shaft 11 and ram cylinder 12, with the green tire G placed on the lower mold section 3, are lowered until the upper bead ring 15 at the lower end of the hollow drive shaft 11 contacts the upper bead of the green tire G, the lower end of the lower cover 26 contacts the upper surface of the lower sealing plate 2. And the upper surface of the lower sealing plate 2 contacted by the lower end of the lower cover 26 has a seal ring 29 of large diameter installed thereon and is formed at its periphery with an L-shaped exhaust port 2a which establishes communication between the inside and outside of the attaching portion of the seal ring 29, and a vacuum source is connected to said air suction port 2a through an air pipe.

Figure 2:
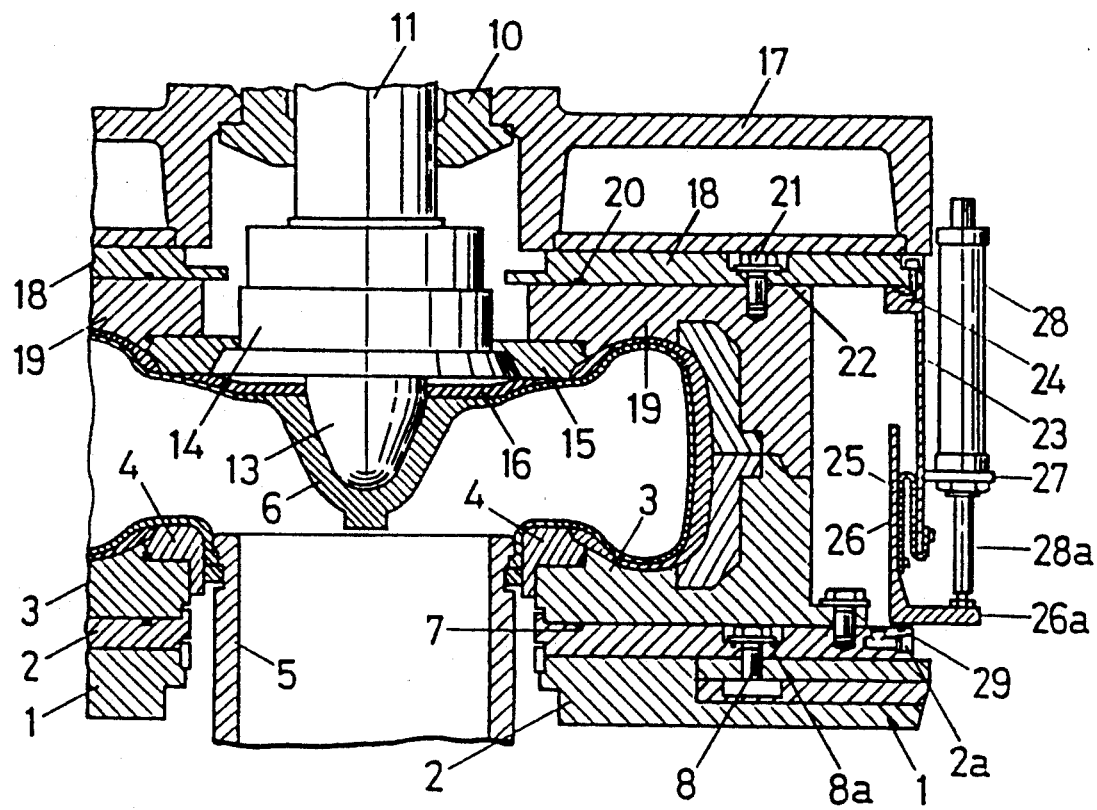
FIG. 2 is a vertical sectional view showing the mold of FIG. 1 in the closed state.

In the construction described above, the upper frame 10, hollow drive shaft 11 and ram cylinder 12 are lowered and the green tire G is nipped between the upper and lower bead rings 15 and 4. When the lower end of the lower cover 26 contacts the upper surface of the lower sealing plate 2 to define a closed space outside the green tire G, the vacuum source connected to the exhaust port 2a of the lower sealing plate 2 is operated to evacuate said closed space and the bladder 6 folded and stored in the bagwell 5 is inflated by compressed air supplied to enter the green tire G to press the green tire G from inside. The lowering of the upper mold section 19 and the evacuation of the closed space proceed and a substantial vacuum is created in said closed space. Thereafter, as shown in FIG. 2, the upper mold section 19 contacts the lower mold section 3 and the green tire G contacts the inner surfaces of the upper and lower mold sections, while the piston rods 28a downwardly urging the lower cover 26 are retracted, causing the upper end of the lower cover 26 to move inside the upper cover 23, so that the seal tube 25 connecting these upper and lower covers 23 and 26 is folded between the upper and lower covers 23 and 26 and vulcanization of the green tire G is started.

Figure 3:
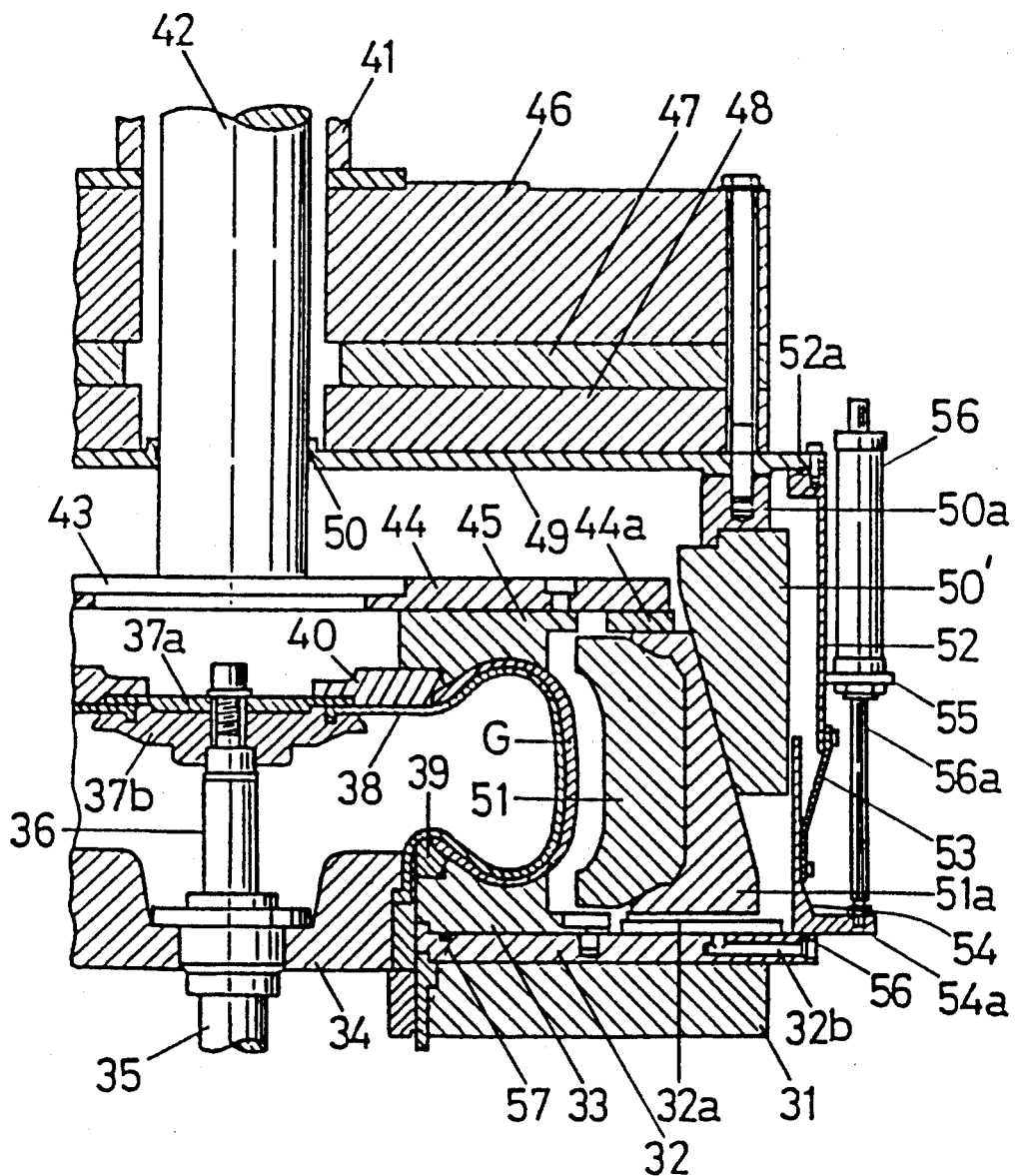
FIG. 3 is a vertical sectional view of an embodiment of a vulcanizing apparatus of the segmental mold type.

FIG. 3 shows an example of a vulcanizing apparatus of the segmental mold type, wherein a lower sealing plate 32 is fixed on a lower platen 31, and a lower mold section 33 is fixed on said lower sealing plate 32 on the inner diameter side. A bladder hollow shaft 35 is installed inside said doughnut-shaped lower mold section 33 through a lower clamp ring 34, and a bladder 38 is held at its upper end opening between a pair of washers 37a and 37b, at the upper end of a bladder center shaft 36 vertically slidably inserted in the bladder hollow shaft 35, and at its lower end opening between the lower bead ring 39 of the lower mold section 33 and said lower clamp ring 34.

Disposed above said bladder center shaft 36 are a hollow upper frame 41 and an upper hollow shaft 42 positioned inside said upper frame 41, and an upper mold section 45 is fixed to the lower end of said upper hollow shaft 41 through a flange 43 and a doughnut-shaped dummy plate 44. Further, an upper sealing plate 49 is fixed to the lower end of the upper frame 41 through a bolster plate 46, an insulator 47, and an upper platen 48. The upper sealing plate 49 covers the lower surface of the upper platen 48 and has a size such that it projects radially outwardly of the upper dummy plate 44 disposed on the upper mold section 45, with the wall surface of its center hole slidably contacting the outer surface of the upper hollow shaft 42 through a seal ring 50. And a jacket ring 50' is fixed around the outer periphery of the upper sealing plate 49 through an intermediate ring 50a surrounding said dummy plate 44, and a segmental sector segment 51 is vertically slidably attached to the downwardly diverging tapered inner surface of said jacket ring 50' through a mold holder 51a. In addition, the upper and lower surfaces of the mold holder 51a for the sector segment 51 are slidable radially along a lower surface guide 44a for the dummy plate 44 and an upper surface guide 32a for the lower sealing plate 32. As the jacket ring 50' is lifted and lowered, the sector segment 51 is radially slid to open and close the larger diameter ends of the upper and lower mold sections 45 and 33.

Thus, an upper cover 52 surrounding the intermediate ring 50 is fixed to the lower surface of the upper sealing plate 49 through a seal ring 52a of the large diameter and, as in the embodiment shown in FIG. 1, a lower cover 54 is connected to the lower end of the upper cover 52 through a seal tube 53. The front ends of the piston rods 56a of air cylinders 56 fixed to the outer surface of the upper cover 52 through brackets 55 are connected to the flange 54a at the lower end of the lower cover 54. In addition, a seal ring 56 of large diameter is installed along the peripheral edge of the lower sealing plate ring 57 contacted by the lower end of the lower cover 54, while a seal ring 57 of small diameter is installed on the smaller diameter side of the lower sealing plate contacted by the lower mold section 33. An L-shaped exhaust port 32b is formed in the larger diameter side of the lower sealing plate 32.

In the embodiment shown in FIG. 3, the upper frame 41 and upper hollow shaft 42 are lowered from above, and when the upper mold section 45 contacts the green tire G, as shown, the mold holder 51a for the sector segment 51 mounts on the lower sealing plate 32, while the lower end edge of the lower cover 54 contacts the upper surface of the lower sealing plate 32 to define a closed space outside the green tire G. Subsequently, the closed space is evacuated, and with the lowering movement of the upper frame 41, the jacket ring 50' continues to lower, with the result that the sector segment 51 is moved toward the center. After said closed space has been substantially completely evacuated, the upper and lower mold sections 45 and 33 and sector segment 51 contact each other, whereupon the vulcanization of the green tire G is started.

Figure 4:
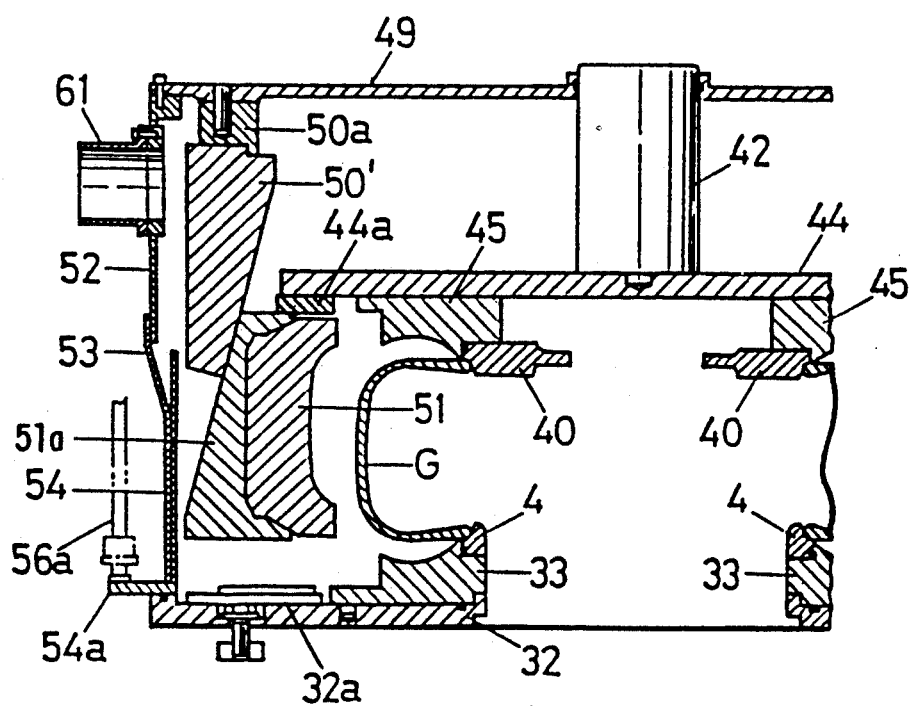
FIG. 4 is a vertical sectional view of another embodiment of a vulcanizing apparatus of the segmental mold type.

FIG. 4 shows another example of a vulcanizing apparatus of the segmental mold type. In this example, an exhaust sleeve 61 is connected to the upper cover 52. The upper mold section 45 and jacket ring 50' are lowered until the lower and upper beads of the green tire G contact the lower and upper bead rings 4 and 40, respectively, whereupon the lower end of the lower cover 54 contacts the lower sealing plate 32 and with this contact the evacuation of the space outside the green tire is started through the upper exhaust sleeve 61. In addition, the bladder is omitted from illustration in FIG. 4.

What is claimed is:

1. A vulcanizing apparatus of the two-piece mold type for pneumatic tires comprising an upper mold section for molding one side carcass and one half of the tread of a pneumatic tire, a lower mold section for molding the opposite side carcass and the other half of the tread, said upper mold being liftable with respect to the lower mold section, an upper sealing plate disposed between said upper mold section and an upper platen for fixing said upper mold section, said upper sealing plate covering the upper surface of said upper mold section and having a greater outer diameter than that of the upper mold section, a lower sealing plate disposed between said lower mold section and a lower platen for fixing said lower mold section, said lower sealing plate covering the lower surface of said lower mold section and having a greater outer diameter than that of the lower mold section, the contact region between the upper mold section and the upper sealing plate and the contact region between the lower mold section and the lower sealing plate being airtightly defined, a cylindrical upper cover surrounding said upper mold section, said cylindrical upper cover being airtightly fixed at its upper end to the outer periphery of the lower surface of the upper sealing plate, a cylindrical lower cover loosely fitted to the upper cover and surrounding the lower mold section, said cylindrical lower cover being connected to the lower end of said upper cover through a flexible seal tube so as to hang therefrom, a plurality of air cylinders fixed at equal intervals to the outer surface of the upper cover with their piston rods directed downward, the front ends of said piston rods being connected to the lower end of the lower cover to urge the latter downward, the urging providing airtight contact surfaces when the lower edge of the lower cover contacts the lower sealing plate, said upper cover, seal tube, lower cover and upper and lower sealing plates forming an expansible cover, the latter being provided with an exhaust port for connecting the inner space to a low pressure source.

2. An apparatus for vulcanizing pneumatic tires comprising an upper mold section for molding one side carcass of a pneumatic tire, a lower mold section for molding the opposite side carcass, and a segmental sector segment for molding the tread, said upper mold section being vertically movable with respect to the lower mold section, said sector segment being slid by the lifting and lowering of a jacket ring surrounding said sector segment and having a downwardly diverging taper, an upper sealing plate covering the lower surface of an upper platen and having a larger outer diameter than that of said jacket ring, said upper sealing plate being disposed between said jacket ring and an upper platen for fixing said jacket ring, a lower sealing plate covering the upper surface of a lower platen and having a larger outer diameter than that of the jacket ring, said lower sealing plate being disposed between the lower mold section and a lower platen for fixing said lower mold section, the contact region between the jacket ring and the upper sealing plate thereby being airtightly formed, a cylindrical upper cover surrounding the jacket ring and airtightly fixed at its upper end to the outer periphery of the lower surface of the upper sealing plate, a cylindrical lower cover loosely fitted to the upper cover and surrounding the jacket ring, said cylindrical lower cover being connected to the lower end of said upper cover through a flexible seal tube so as to hang therefrom, a plurality of air cylinders fixed at equal intervals to the outer surface of the upper cover with their piston rods directed downward, the front ends of said piston rods being connected to the lower end of the lower cover to urge the latter downward, the urging providing airtight contact surfaces when the lower surface of the lower cover contacts the lower sealing plate, said upper cover, seal tube, lower cover and upper and lower sealing plates forming an expansible cover, the latter being provided with an exhaust port for connecting its inner space to a low pressure source.

* * * * *